United States Patent [19]
Fukunaga et al.

[11] Patent Number: 5,241,820
[45] Date of Patent: Sep. 7, 1993

[54] TORQUE CONVERTOR

[75] Inventors: Takao Fukunaga; Kozo Mori, both of Neyagawa, Japan

[73] Assignee: Daikin Clutch Corporation, Osaka, Japan

[21] Appl. No.: 828,694

[22] Filed: Jan. 31, 1992

[30] Foreign Application Priority Data

Feb. 5, 1991 [JP] Japan .................. 3-036817

[51] Int. Cl.$^5$ .............................................. F16D 33/00
[52] U.S. Cl. ........................................ 60/341; 60/330; 60/361
[58] Field of Search .................... 60/330, 341, 361

[56] References Cited

U.S. PATENT DOCUMENTS

| | | | |
|---|---|---|---|
| 3,385,060 | 5/1968 | Lazarus | 60/341 |
| 3,537,262 | 11/1970 | Briski | 60/341 |
| 4,044,556 | 8/1977 | Kuramochi et al. | 60/361 |
| 4,049,093 | 9/1977 | Vukovich et al. | 60/361 X |
| 4,186,557 | 2/1980 | Arai et al. | 60/361 |
| 4,624,105 | 11/1986 | Nishimura et al. | 60/361 |
| 4,726,185 | 2/1988 | Shigemasa et al. | 60/361 |
| 4,783,960 | 11/1988 | Kubo et al. | 60/338 |
| 4,866,935 | 9/1989 | Hayabuchi et al. | 60/361 |
| 5,058,027 | 10/1991 | Becraft | 60/330 X |

FOREIGN PATENT DOCUMENTS 2131953 12/1972 Fed. Rep. of Germany ........ 60/330

Primary Examiner—Edward K. Look
Assistant Examiner—John Ryznic
Attorney, Agent, or Firm—Armstrong, Westerman, Hattori, McLeland & Naughton

[57] ABSTRACT

A torque convertor having a tubular toroidal member constituted by a pump, a turbine and a stator is so dimensioned that sufficient room is provided to accommodate associated components without sacrificing performance standards. In particular, since the cross sectional area of the flow passage of the stator, wherein eddies tend to generate and power transmission loss due to fluid collision increases, is larger in proportions to the cross sectional area of either the pump or the turbine the fluid turbulence is reduced.

8 Claims, 1 Drawing Sheet

TORQUE CONVERTOR

BACKGROUND OF THE INVENTION

The present invention relates to a torque convertor composed of a pump, a turbine and a stator which form a hydraulic-fluid circulating tubular toroid.

The pump, turbine and stator of the torque convertor constitute three types of wheels having vanes which transmit torque by the agency of a hydraulic fluid.

Torque convertors have been disclosed in which the degree of "flatness" with respect to the cross section of the toroid formed by the three vane wheels is increased. The consequently reduced axial length of the torque convertor provides advantages of weight reduction and increased efficiency of power transmission, and facilitates the multi-stage capacity of the transmission itself. Additionally, the reduced dimension of the toroid in the axial direction of the convertor allows room for the installation of a lock-up device having multiple discs.

However, the modified vane wheels tend to generate eddies in the hydraulic fluid as it is passed through, such that the fluid furthermore collides with the vanes, degrading the performance of the torque convertor. Consequently, it is desirable to retain comparable performance characteristics in a torque convertor having its toroid components modified to increase the axial flatness of the convertor.

A torque convertor disclosed in Japanese Patent Laid-Open No. 57-37791 has flattened toroid components providing torque convertor performance which is up to par. The flatness ratio L/H, wherein L is the length of the tubular toroid in the axial length of the convertor and H the length in the radial direction thereof as well, is set within the range of 0.64 to 0.87. According to these specifications, however, the tubular toroid can't be sufficiently flattened to provide the necessary accommodation room along the axial direction of the torque convertor.

SUMMARY OF THE INVENTION

It is an object of the present invention to optimize a flattening modification of the vane wheels forming the toroidal element of a torque convertor such that its performance standards remain on par.

The torque convertor according to an aspect of the present invention includes a tubular toroid formed by a pump, a turbine and a stator. The flatness ratio L/H of the toroid, defined as the axial length L in proportion to the radius H, is in the range of 0.55 to 0.65. The diameter ratio d/D, defined as the inside diameter d of the tubular toroid in proportion to its outside diameter D is in the range of 0.35 to 0.45. Its flow passage area ratio a1/A is in the range of 0.16 to 0.20, wherein A is the area of the circle defined by the outermost diameter of the tubular toroid and a1 is the area of the flow passage of the pump and the turbine. The flow passage area ratio a2/A, wherein a2 is the flow passage area of the stator, is greater than the ratio a1/A by 0.02 to 0.04 and is in the range of 0.19 to 0.23.

The torque convertor which is in accordance with the foregoing specifications is provided sufficient axial room within while quality of its performance is maintained. Particularly, since the relative flow passage area of the stator, wherein eddies tend to arise, leading to performance loss due to increased fluid collision, is larger than the relative flow passage area of the other vane wheels, the fluid turbulence is reduced.

The foregoing and other objects, aspects and advantages of the present invention will become more apparent from the following detailed description.

BRIEF DESCRIPTIONS OF THE DRAWINGS

FIG. 1 is a cross sectional, partial view of a torque convertor according to an embodiment of the present invention.

DESCRIPTION OF THE PREFERRED EMBODIMENTS

Figure 1:
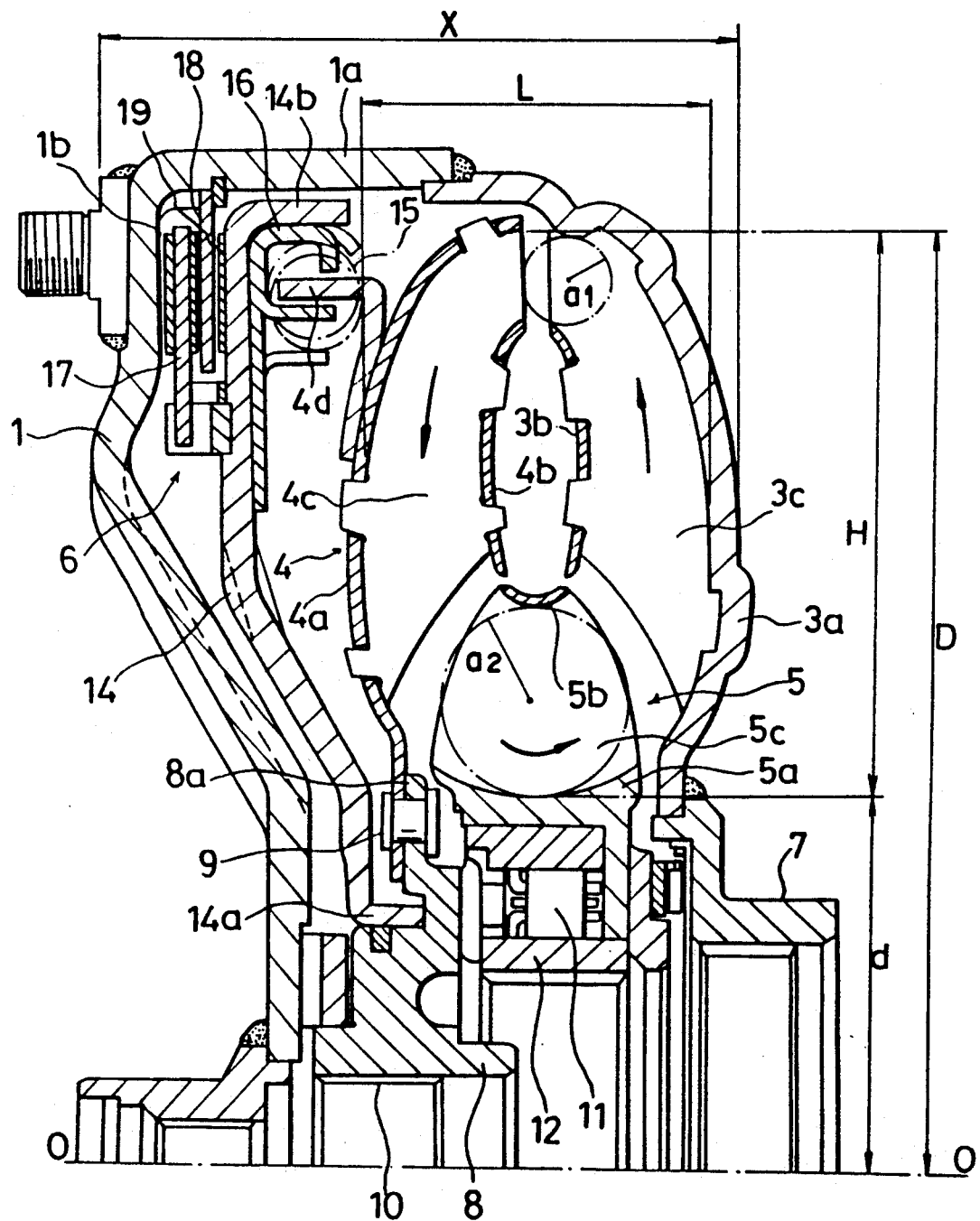

Reference is made to the figure illustrating a torque convertor according to the present invention, wherein the line O—O represents its rotational axis.

A front cover 1 and an impeller shell 3a which is welded to a projecting rim portion 1a of the front cover 1 form a hydraulic fluid chamber, in which three types of vane wheels (a pump 3, a turbine 4 and a stator 5), which together form a tubular toroid, and a lock-up device 6 are disposed. The radially inner portion of the impeller shell 3a is welded to an impeller hub 7.

The front cover 1 is connected to the crank shaft of an engine (not shown) so as to be driven thereby.

The pump 3 is composed principally of a impeller shell 3a, an annular inner shell 3b, and a plurality of vanes 3c disposed between the impeller shell 3a and the inner shell 3b at given circumferential spacings. The turbine 4 is located opposite the pump 3. The turbine 4 is composed principally of an outer shell 4a, an inner shell 4b, and a plurality of vanes 4c disposed between the outer shell 4a and the inner shell 4b at given circumferential spacings. The radially inner portion of the turbine outer shell 4a is fixed to a flange 8a of a turbine hub 8 by means of rivets 9. The turbine hub 8 has inner splines 10 which are in meshing engagement with their counterparts on an output shaft (not shown).

Disposed between the radially inner portions of the pump 3 and the turbine 4 is a stator 5, which is composed principally of a stator carrier 5a, an inner shell 5b, and a plurality of vanes 5c which are fixed along the stator carrier 5c at given circumferential spacings and retain the inner shell 5b. The stator carrier 5a is connected to an inner race 12 through a one-way clutch 11.

Accordingly, the outer shells and the inner shells around each wheel of vanes wheel form annular flow passages through which hydraulic fluid circulates counterclockwise, as shown by arrows in the figure. The exit of the pump 3 is adjacent to the entrance of the turbine 4 and the exit of the turbine 4 is adjacent to the entrance of the stator 5 and the exit of the stator 5 is adjacent to the entrance of the pump 3, thereby forming a tubular toroid configuration.

The vanes of the vane wheels are disposed such that when the pump 3 rotates together with the front cover 1, hydraulic fluid flows from the pump 3 into the turbine 4, rotating it. Fluid flowing from the turbine 4 to the stator 5 is coordinately returned toward the pump 3 by the vanes 5c of the stator 5. In particular, the stator 5 alters the momentum of the hydraulic fluid such that a high torque ratio is achieved when the pump 3 rotates at a high speed and the turbine 4 rotates at a low speed.

The lock-up device 6 is disposed between and coaxial with the turbine 4 and the front cover 1 and includes a disc-like piston 14 of which the radially inner portion 14a is slidably retained by the flange 8a of the turbine hub 8. The piston 14 has projecting rim portion 14b protruding toward the turbine 4.

Radially inward of the projection rim portion 14b of the piston 14, a plurality of torsion springs 15 extending circumferentially are disposed. A retaining plate 16 fixed to the inner side of the piston 14 has bent portions which seat the ends of the torsion springs 15. Turbine seats 4d fixed to the radially outer portion of the outer shell 4a of turbine 4 also retain the ends of the torsion springs 15, whereby the turbine 4 is in circumferentially elastic connection with the piston 14.

An annular friction member 19 is affixed along the margin of the lateral surface of the piston 14, opposite a flat friction surface 1b of the front cover 1. Between the friction surface 1b and the friction member 19, a clutch disc 17 and a clutch plate 18 are disposed, thus constituting a multiple disc clutch. The clutch disc 17 is engaged with the piston 14 such that the clutch disc 17 cannot rotate relative to the piston 14 but can slide in the axial direction. The clutch plate 18 is engaged with the projecting rim portion 1a of the front cover 1 such that the clutch plate 18 cannot rotate relative to the front cover 1 but can slide in the axial direction.

The torque convertor according to the embodiment has a flatness ratio L/H specified to be within the range of 0.55 to 0.65, wherein L is the length of the tubular toroid in the axial direction of the convertor and H is the length of the tubular toroid in the radial direction thereof. Its diameter ratio d/D is specified to be within the range of 0.35 to 0.45, wherein d is the diameter of the radially inward limit of the tubular toroid and D is the diameter of the radially outward limit thereof. Another ratio a1/A is specified to be within the range of 0.16 to 0.20, wherein A is the area of the circle through the outermost diameter $D(A=2.1416 \times D_2)$ of the tubular toroid and a1 is the flow passage area (the area of the cross-section normal to the flow passage) of the pump 3 and the turbine 4. One further ratio a2/A is greater than the ratio a1/A by 0.02 to 0.04, and is in the range of 0.19 to 0.23, wherein a2 is the flow passage area of the stator 5.

If the ratio L/H were below 0.55, the inner shells 3b and 4b would be made flatter and eddies would be likely to arise, thereby degrading the performance of the torque convertor. If the ratio L/H were above 0.65, the resulting toroid would be of insufficient flatness. If the ratio a1/A were below 0.16, the flow passage area of the pump 3 and the turbine 4 would be reduced, whereby the rate of flow per unit time would decrease, and the capacity of the torque convertor would decrease. If the difference of the ratios a2/A and a1/A were less than 0.02, transmission power loss due to collision of the hydraulic fluid at the stator 5 entrance (a portion adjacent to the exit of the turbine 4) would increase, degrading the performance efficiency. If the difference of the ratio a2/A and a1/A were greater than 0.04, the stator 5 would not be able to step up the input/output torque ratio sufficiently. If the ratios a2/A were below 0.19, the collision loss at the stator would be increased. Furthermore, if the ratio a2/A were above 0.23, the torque would not be sufficiently increased.

The torque convertor dimensioned according to the aforedescribed specifications achieves a desirable degree of flatness without degradation in its performance. The principal cause of diminished torque convertor performance is the tendency of eddies to form around the stator, in which region the hydraulic fluid must undergo a large-angle change in flow over a short distance. However, in this embodiment, the flow passage area ratio a2/A of the stator 5 is specified to be greater than the flow passage area ratio of the pump 3 and the turbine 4 by a an essential amount such that power loss due to fluid collision at the stator 5 are decreased, whereby the momentum conversion capability of the stator 5 is maintained.

Meanwhile, since the flatness ratio L/H of the tubular toroid is reduced, the accommodation room within the torque convertor is increased. As a result, a lock-up device 6 having its lock-up function improved by the application of a multiple-disc clutch, can be installed in the torque convertor without necessitating an increase in the overall axial length X (indicated in the figure). By the reduced length L of the toroid, condensation of the torque convertor is realized, reducing its weight and improving the fuel economy of the vehicle to which it is applied.

Various details of the invention may be changed without departing from its spirit not its scope. Furthermore, the foregoing description of the embodiment according to the present invention is provided for the purpose of illustration only, and not for the purpose of limiting of the invention as defined by the appended claims and their equivalents.

What is claimed is:

1. A torque convertor in which a pump, a turbine and a stator constitute a tubular toroid through which a hydraulic fluid circulates; wherein a ratio L/H in which L is the axial length of said tubular toroid and H is the radial length of said tubular toroid is specified to be in the range of 0.55 to 0.65, a ratio d/D in which d is the inside diameter of said tubular toroid and D is an outside diameter of said tubular toroid is specified to be in the range of 0.35 to 0.45, an area ratio a1/A in which a1 is the area of the cross-section normal to the flow within said pump and turbine passages and A is the area of the circle defined by the outermost diameter of said tubular toroid is specified to be in the range of 0.16 to 0.20, and an area ratio a2/A is larger than said area ratio a1/A by 0.02 to 0.04 and is in the range of 0.19 to 0.23 where a2 is the area of the cross-section normal to the flow within said stator.

2. A torque convertor according to claim 1, further comprising a first outer shell which can be coupled to an input rotation member and encompasses said tubular toroid, and wherein said pump comprises said first outer shell, a plurality of pump vanes fixed along their longitudinal edges between the interior of said first outer shell, and a first inner shell opposite said first outer shell, forming a flow passage between said first outer shell and said first inner shell, said turbine comprises a second outer shell which can be connected to an output member, a plurality of turbine vanes fixed along their longitudinal edges between said second outer shell and a second inner shell, forming a flow path between said second outer and said second inner shells, and said stator comprises a stator carrier, a plurality of stator vanes fixed along their longitudinal edges between said stator carrier and a third inner shell, forming a flow passage between said stator carrier and said third inner shell.

3. A torque convertor according to claim 2, wherein each of said flow passages is formed such that the exit of said pump is adjacent to the entrance of said turbine and the exit of said turbine is adjacent to the entrance of said stator and the exit of said stator is adjacent to the entrance of said pump, thereby constituting said tubular toroid.

4. A torque convertor according to claim 3, further comprising a lock-up device for mechanically connecting said first outer shell and said turbine, disposed in a space formed between said first outer shell and said second outer shell of said turbine.

5. A torque convertor according to claim 4, wherein said lock-up device is disposed coaxially with said turbine.

6. A torque convertor according to claim 5, wherein said lock-up device includes a disc-like piston movable in the axial direction and a plurality of lock-up discs movable axially between said piston and said first outer shell.

7. A torque convertor according to claim 6, wherein said plurality of lock-up discs comprise a first disc engaged with said first outer shell so as to be slidable in the axial direction and non-rotatable relative of said disc-like piston, and a second disc engaged with said piston so as to be slidable in the axial direction and non-rotatable relative to said first outer shell.

8. A torque convertor according to claim 7, wherein said lock-up device includes an elastic member elastically connecting said piston and said second outer shell of said turbine.

* * * * *